US008898010B2

(12) United States Patent
Modica et al.

(10) Patent No.: US 8,898,010 B2
(45) Date of Patent: Nov. 25, 2014

(54) DEVIATION DETECTION IN MOBILE TRANSIT SYSTEMS

(71) Applicant: Navteq B.V., Veldhoven (NL)

(72) Inventors: Leo Modica, Wheaton, IL (US); Leon Stenneth, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 13/739,560

(22) Filed: Jan. 11, 2013

(65) Prior Publication Data
US 2014/0200805 A1    Jul. 17, 2014

(51) Int. Cl.
G01C 21/00 (2006.01)
G01C 21/20 (2006.01)
G01C 21/30 (2006.01)
G01S 19/22 (2010.01)

(52) U.S. Cl.
CPC ............... G01C 21/20 (2013.01); G01C 21/30 (2013.01); G01S 19/22 (2013.01)
USPC ............................ 701/466; 701/445; 701/446

(58) Field of Classification Search
USPC ................... 701/445–446, 450, 466
See application file for complete search history.

(56) References Cited

U.S. PATENT DOCUMENTS

| 4,092,718 | A | 5/1978 | Wendt |
| 4,791,571 | A | 12/1988 | Takahashi et al. |
| 5,068,654 | A | 11/1991 | Husher |
| 5,541,845 | A | 7/1996 | Klein |
| 6,487,496 | B2 | 11/2002 | Katayama et al. |
| 6,694,248 | B2 | 2/2004 | Smith et al. |
| 7,469,827 | B2 | 12/2008 | Katragadda et al. |
| 2004/0008128 | A1* | 1/2004 | Linkohr et al. ............... 340/988 |
| 2007/0208504 | A1* | 9/2007 | Lee ............................... 701/208 |
| 2007/0294024 | A1* | 12/2007 | Sasaki .......................... 701/200 |
| 2008/0004804 | A1 | 1/2008 | Fujita et al. |
| 2008/0040071 | A1* | 2/2008 | McKitterick ................. 702/159 |
| 2009/0319174 | A1* | 12/2009 | Ishigami et al. ............. 701/201 |

(Continued)

FOREIGN PATENT DOCUMENTS

EP 2224210 A2 9/2010
WO WO2008092008 A2 7/2008

OTHER PUBLICATIONS

Keith W. Cunningham, "Modeling Bus Routes and Bus Stops", Spatial Data Research, Inc, 2003.
Search Report cited in PCT/EP2013/076025, mailed Mar. 25, 2014.

Primary Examiner — Hussein A. Elchanti
(74) Attorney, Agent, or Firm — Lempia Summerfield Katz LLC

(57) ABSTRACT

In one embodiment, a mobile device or a network device is configured to identify when a transit vehicle deviates from a transit path. The mobile device is configured to perform a positioning technique to generate data indicative of the location of a mobile device. Based on the location of the mobile device, a path is identified. The path is associated with an estimated path width based on the classification of the path and/or the accuracy of the positioning technique. A target route is calculated using the estimated path width. As the transit vehicle travels, the target route is compared to the location of the mobile device. If the mobile device and or transit vehicle deviates from the target route, a message is generated. The message may indicate that the transit vehicle is being re-routed and/or recommends the computation of a new path.

18 Claims, 8 Drawing Sheets

(56) References Cited

U.S. PATENT DOCUMENTS

| | | |
|---|---|---|
| 2010/0145576 A1* | 6/2010 | Doi .................................. 701/41 |
| 2012/0232795 A1* | 9/2012 | Robertson et al. ............ 701/532 |
| 2012/0313780 A1* | 12/2012 | Stout et al. .................... 340/540 |
| 2013/0013197 A1* | 1/2013 | Damon ......................... 701/445 |
| 2013/0073204 A1* | 3/2013 | Vu et al. ........................ 701/533 |
| 2013/0150078 A1* | 6/2013 | Furuta ......................... 455/456.1 |
| 2013/0151139 A1* | 6/2013 | Park .............................. 701/410 |
| 2013/0245945 A1* | 9/2013 | Morita et al. ................. 701/533 |

* cited by examiner

DEVIATION DETECTION IN MOBILE TRANSIT SYSTEMS

FIELD

The following disclosure relates to location tracking in transportation systems.

BACKGROUND

Transportation systems include automobiles, buses, trains, and other modes of transportation. Example transportation systems include the public transit systems of many metropolitan areas. In a transit system, the transit vehicle typically follows a set route. The route is a path from station to station or from stop to stop.

Occasionally, transit vehicles do not follow the scheduled routes. In the example of bus routes, a bus may be re-routed because of a traffic incident (e.g., an accident or congestion), a flood, an event (e.g., a parade or motorcade), or a variety of reasons. In the example of train routes, track construction, or accident may cause the train to use a different line of tracks. Sometimes the re-routing is scheduled and sometimes the re-routing occurs without warning.

Transit vehicles may also deviate from schedules because of delays arising from route deviations or re-routes. Ideally, each vehicle on the route arrives at each station or stop on the path according to a precise schedule. However, several events can disrupt the schedule. In the example of bus routes, an accident or congestion can cause traffic, which delays the buses. In addition, when many riders have congregated at a stop, the bus is delayed as riders enter the bus and scan their fare cards. In the example of train routes, heavy usage or interference by other trains causes delays for riders to board and disembark.

These usage types of delays tend to snowball. When a bus is late, more riders aggregate at a stop. When the bus arrives, more time is required to board all of the extra riders. Fewer riders are at the stop when the next bus arrives, which causes the next bus to spend less time at the spot and tend to catch up with the first bus.

Both temporal and spatial deviations of transit vehicles impair the ability of users to predict when the transit vehicle will arrive at a stop or station and/or locate the new location of the stop or station.

SUMMARY

In one embodiment, a mobile device or a network device is configured to identify when a transit vehicle deviates from a transit path. The mobile device is configured to perform a positioning technique to generate data indicative of the location of a mobile device. Based on the location of the mobile device, a path is identified. The path is associated with an estimated path width based on the classification of the path and/or the accuracy of the positioning technique. A target route is calculated using the estimated path width. As the transit vehicle travels, the target route is compared to the location of the mobile device. If the mobile device and or transit vehicle deviates from the target route, a message is generated. The message may indicate that the transit vehicle is being re-routed and/or recommends the computation of a new path.

BRIEF DESCRIPTION OF THE DRAWINGS

Exemplary embodiments of the present invention are described herein with reference to the following drawings.

DETAILED DESCRIPTION

The following embodiments include the detection in real time of when and where a mobile transit object deviates from a scheduled route or a historical route. The scheduled route may be a series of estimated times paired with geographic locations for transit stops or stations. The historical route may be an average of recorded times and/or geographic locations from past routes on the transit system. The deviation may be either spatial or temporal. Once the deviation is identified, the deviation may be utilized to choose a new route or derive the new route for display to users. In addition, the deviating location points may be used to construct a new route leg, a new stop, and/or new schedules for the transit system. The new information may be transmitted to users or the transit system administrator.

Figure 1:
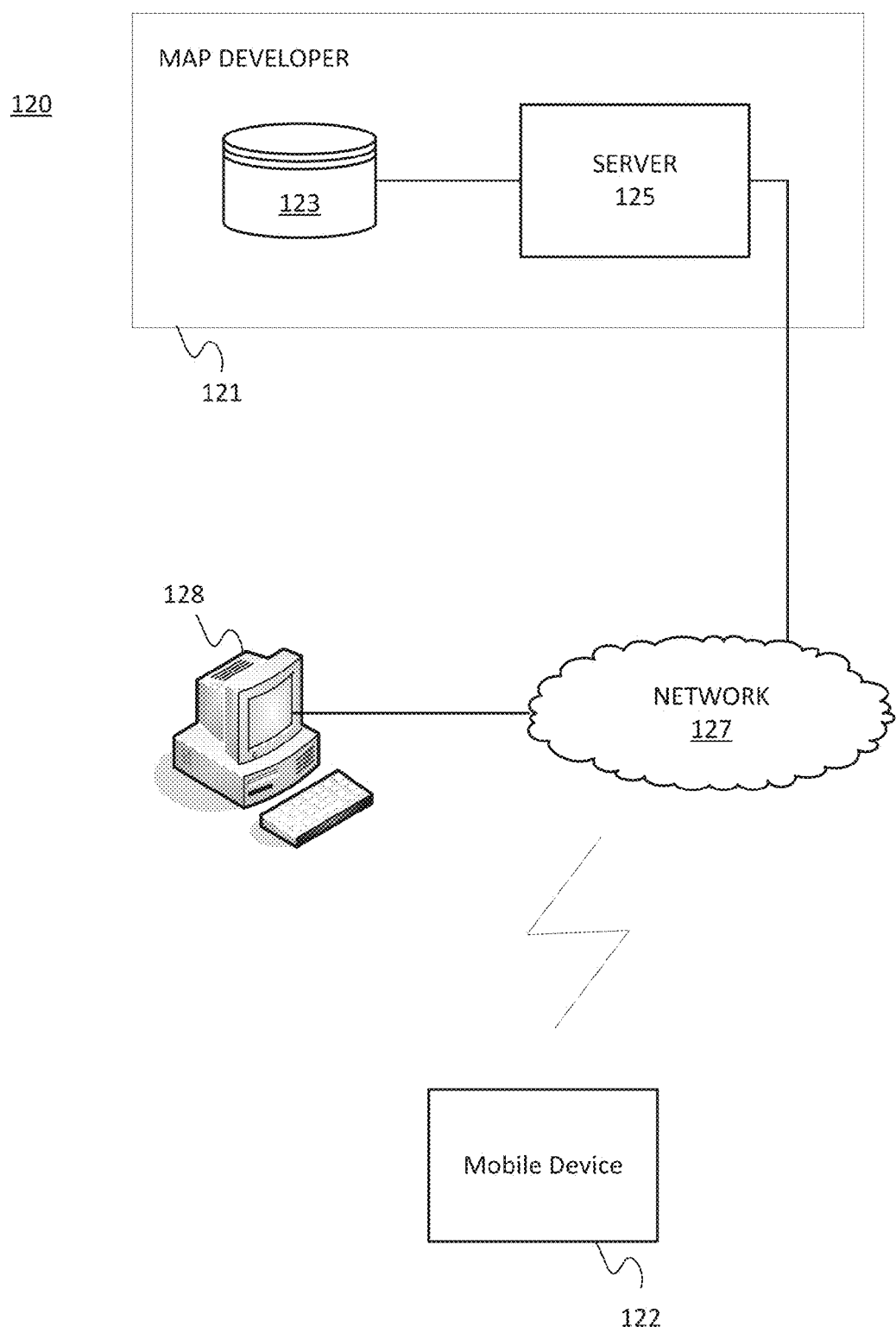
FIG. 1 illustrates an exemplary navigation system for route deviation detection.

FIG. 1 illustrates an exemplary navigation system 120 for route deviation detection. The navigation system 120 includes a map developer system 121, a mobile device 122, a workstation 128, and a network 127. Additional, different, or fewer components may be provided. For example, many mobile devices 122 and/or workstations 128 may connect with the network 127.

The mobile device 122 is configured to calculate the geographic location of the mobile device 122. The geographic location may be determined through Global Positioning System (GPS) or another technique. The mobile device 122 generates a message including the geographic location and sends the message to the server 125.

The server 125 is configured to receive the message including data indicative of the geographic location of the mobile device 122 and identify a route or path that the mobile device 122 is likely following. The route may be a bus route stored ahead of time by server 125. The selected route may be estimated based on the geographic location of the mobile device 122. For example, the server 125 may compare a list of locations for paths of bus routes to the geographic location of the mobile device 122. Multiple locations over time of the mobile device 122 may be used to resolve any ambiguity regarding multiple bus routes at a given location of the mobile device 122. Alternatively, the route may be identified in the message received from the mobile device.

The database 123 is configured to store a list of routes. The routes may be bus routes, train routes, or other types of routes. Each route may traverse different types of paths. For example, a bus route may follow a major highway for one portion of the route and a residential street for another portion of the route. The database 123 may describe each type of path on the route. In one example, the database 123 lists characteristic information for the path. The characteristic information includes the type of the path (e.g., highway, street) and/or the size of the path (e.g., 2 lanes, 20 feet).

The server 125 is configured to access the characteristic information for the path from the database 123. The server 125 determines a target route for the path. The path is a line and the target route is an area that includes the path. The target route is sized according to the characteristic information. The target route has a width based on the characteristic information. For example, the target route for a highway is generally wider than the target route for a residential street, and the target route for a three lane road is wider than the target route for a two lane road.

The target route may also be adjusted according to the accuracy of the positioning technique of the mobile device 122. For example, when GPS is used, accuracy depends on the line of sight to the sky. GPS performs better in open rural areas than in urban areas or areas with other cover. The database 123 may include data indicative of GPS accuracy. The data indicative of GPS accuracy may describe whether or not specific geographic locations are considered an urban canyon, which is defined as an area dominated by tall buildings. Tall buildings may partially block GPS signals. The data indicative of GPS accuracy may indicate city or rural, may be a distance, or may be a value on a rating scale (e.g., 1 to 10).

The data indicative of GPS accuracy may be derived from a building model stored in the database 123. The building model describes the two-dimensional footprint or the three-dimensional size of buildings. The server 125 may access the building model and compare the relative sizes of buildings near the geographic location of the mobile device 122 to a threshold level. Alternatively, the GPS accuracy for different locations is stored and accessed, received from the mobile device 122, or otherwise calculated.

The target route may also be sized according to a baseline calculated from historical data. The historical data may be location points collected from vehicles following the same route. For example, the transit vehicles may report a current geographic positioned at a regular interval (e.g., every minute, every 20 seconds). Alternatively, the location points may be collected in response to requests sent from the server 125. The server 125 may be configured to filter the data. For example, outliers may be removed. In addition, the server 125 may average sets of collected location points to calculate the baseline. The sets of collected location points may be grouped in clusters dependent on the proximity of the location points with respect to one another.

The server 125 is configured to determine whether the location of the mobile device 122 deviates from the path based on a comparison of the current geographic location of the mobile device 122 to the target route. The current geographic location may be the same location used to select the path. However, often, the current geographic location may be determined later in time than the location used to select the path. The current geographic location may be determined periodically. Periodically is defined as over time at intervals such that the intervals are not necessarily equally spaced and can be of any duration. Alternatively, the intervals may be evenly spaced.

The server 125 may calculate a width for the target route and compare the width or half of the width to a distance from the current geographic location of the mobile device 122 to the center of the target route, which is the location of the path.

When the half of the width exceeds the distance, the mobile device 122 falls within the target route. Therefore, the mobile device 122 has not deviated from the target route. However, when the distance exceeds half of the width, the mobile device 122 has deviated from the target route. The server 125 may determine from the deviation or the size of the deviation that the transit vehicle has been re-routed.

The server 125 may request additional location points from the mobile device 122 in or to construct the rerouted path. For example, in response to the server 125 determining that the mobile device 122 has deviated from the target route, the server 125 may generate a request for subsequent geographic position measurements to be made by the mobile device 122. The additional position data may be used to construct the re-routed path, both temporally and spatially, of the transit vehicle.

The server 125 may generate an error message that indicates that the mobile device 122 has left the target route. The error message may be sent to a transit authority server as an indication that the transit vehicle is being rerouted. The error message may be sent to individual user devices by way of a bus tracking application or navigation application. The user devices may be configured to adjust stop times or stop locations according to the error message.

In the alternative or in addition to spatial deviations, the server 125 may be configured to identify temporal deviations. The server 125 is configured to access a schedule for the transit route for an expected time for the current geographic location. The server 125 is configured to calculate a temporal deviation value based on the comparison of the expected time to a current time. The server 125 determines subsequent stop times for the transit route based on the temporal deviation value. The temporal deviation may be adjusted according to an adjustment value based on observed noise related to traffic or weather.

The developer system 121 includes a server 125 and a database 123. The optional workstation 128 is a general purpose computer including programming specialized for the following embodiments. The workstation 128 includes at least a memory, a processor, and a communication interface. The developer system 121 may include computer systems and networks of a system operator such as NAVTEQ or Nokia Corporation. The geographic database 123 may be partially or completely stored in the mobile device 122.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The mobile device 122 is a smart phone, a mobile phone, a personal digital assistant ("PDA"), a tablet computer, a notebook computer, a personal navigation device ("PND"), a portable navigation device, and/or any other known or later developed mobile device.

The optional workstation 128 is a general purpose computer including programming specialized for providing input to the server 125. For example, the workstation 128 may provide settings for the server 125. The settings may include a value for the predetermined interval that the server 125 requests mobile device 122 to relay current geographic locations. The workstation 128 may be used to enter data indicative of GPS accuracy to the database 123.

Figure 2:
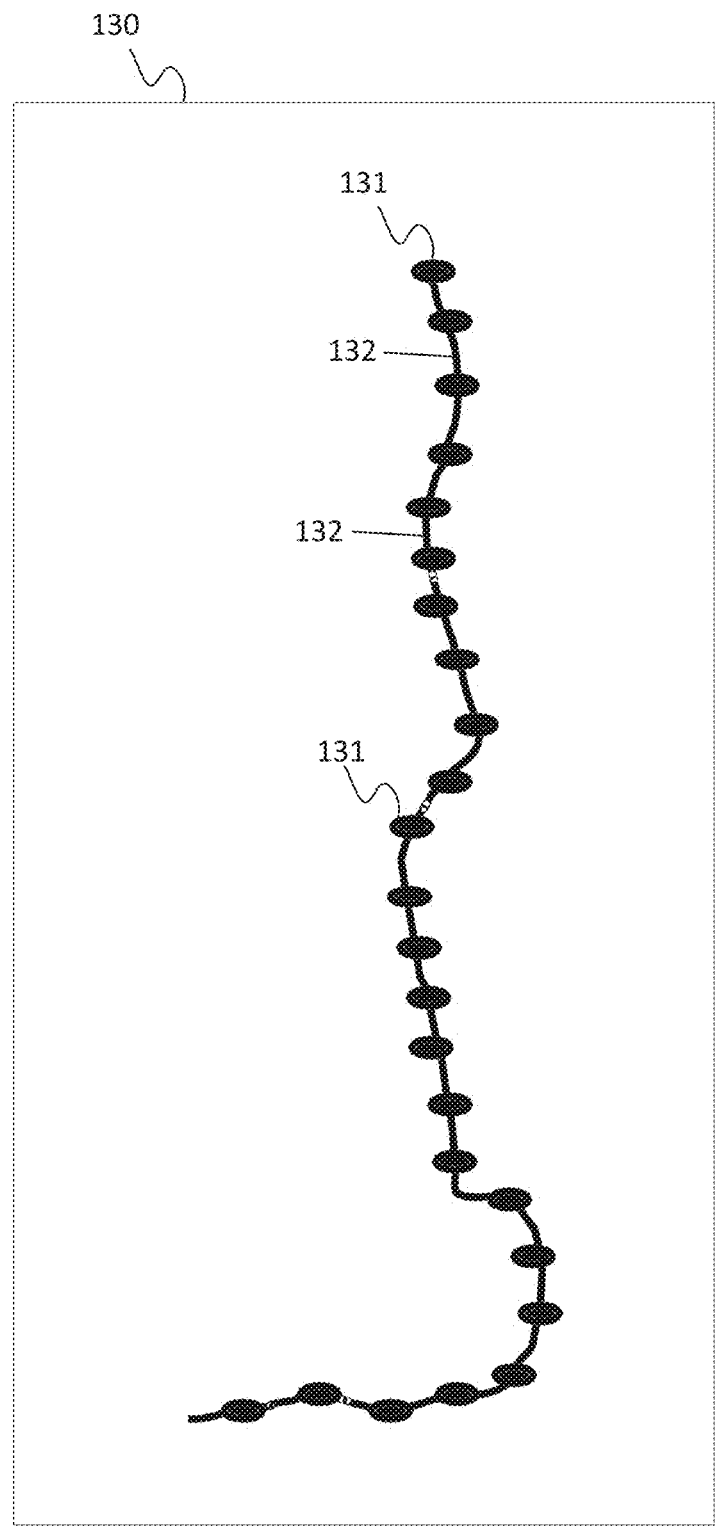
FIG. 2 illustrates an example transit path.

FIGS. 2-5 show example operation of the system of FIG. 1 relative to paths or routes. FIG. 2 illustrates a transit path 130. The transit path 130 includes nodes 131 and segments 132. The nodes 131 may be defined as a cluster of points. The nodes 131 may be at predetermined locations, such as transit stops. Alternatively, the nodes 131 may be calculated based on location data collected by the mobile device 122 or multiple mobile devices.

The server 125 may be configured to define the transit path 130 according to historical data. For example, the server 125 may be configured to compare the relative locations of data points in the location data to identify sets of data points. The sets of data points may be within a threshold distance from one another. In one example, the server 125 selects a location data point and counts the number of location data points within the threshold distance from the first selected data point. If the number of location data points exceeds a minimum number (e.g., 2, 5, 10), the set of data points are identified by the server 125 as a cluster. The cluster may be stored as a geographic range including the set of data points or the cluster may be stored as a point that is the average of the set of data points. The distance between clusters may be arbitrary as a result of dependence on the clustering of the data points. Alternatively, the server 125 may target a specific distance between clusters.

Figure 3:
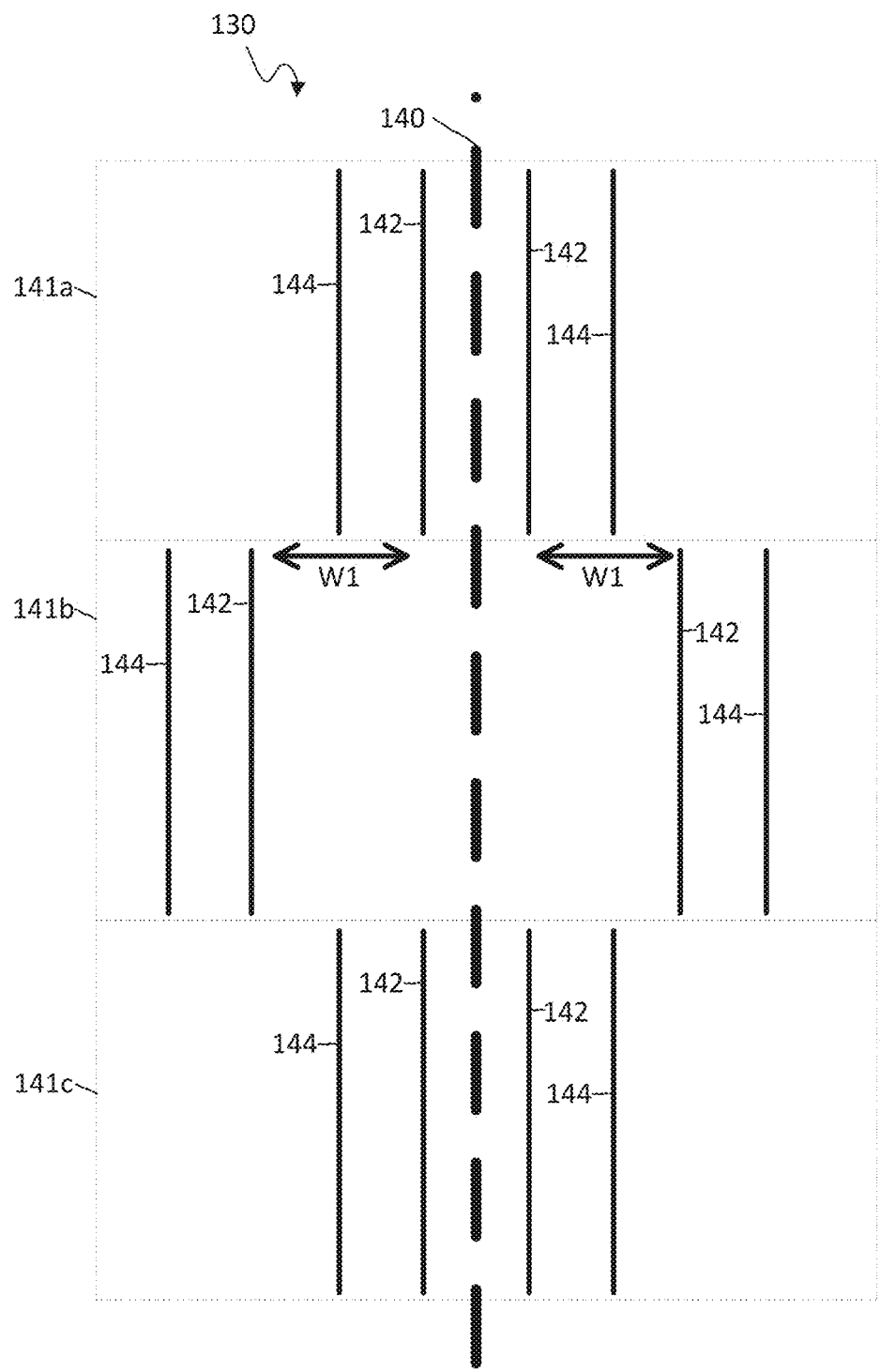
FIG. 3 illustrates an example target route for the transit path of FIG. 2.

FIG. 3 illustrates an example target route for the transit path 130 of FIG. 2. The path may be a dimensionless line between two points. Alternatively, the target route is an area with a width associated with the transit path 130. The target route may have different widths at different locations. For example, the example target route shown in FIG. 3 includes three portions 141a-c. The first portion 141a of the target route has a width smaller than the second portion 141b of the target route.

The target route may include an inner width and an outer width. In the first portion 141a, the inner width is between boundaries 142, and the outer width is between boundaries 144. The inner width may be defined according to a functional classification of the path. The functional classifications may be defined according to a custom classification system defined using workstation 128 and stored in database 123. Alternatively, the functional classifications may be defined according to a predetermined classification system. Table 1 lists example classification systems.

TABLE 1

| Simple System | Complex System | U.S. Long Distance Roads | Highway Tags |
| --- | --- | --- | --- |
| Arterial Road | Interstates | Interstate Expressway | Motorway |
| Collector Road | Principal Arteries | Federal Highway | Trunk |
| Local Road | Minor Arteries | State Highway | Primary |
| | Major Collector | County Highway | Secondary |
| | Minor Collector | Local Road | Tertiary |
| | Local Road | | Residential |

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size.

Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

Alternatively, the inner width may be defined according to the width of the roads or the number of lanes of the roads. For example, the database 123 may list road width or lane quantities. The server 125 may access the database for the road width according to the geographic location reported by the mobile device 122. The road width may be used as an initial value of the target route.

The outer width between boundaries 144 may be determined according to the accuracy of the location determination technique. The accuracy of the location determination technique may be measured directly or may be inferred from the geographic surroundings of the mobile device 122 or other source. The database 123 may store geographic locations of urban canyons where tall buildings affect the accuracy of GPS and other location determination techniques.

The outer width between boundaries 144 may be calculated form the location of the inner width between boundaries 142. In one example, the outer width is defined to be 25% wider than the inner width when no urban canyon is present and 50% wider than the inner width when an urban canyon is present. The outer width may be adjusted by any percentage or any distance. In another example, the outer width may be adjusted in an amount proportionally to a scale factor (e.g., from 1 to 10) of the accuracy of the location determination technique. The scale factor (k) may be stored by the mobile device 122 and included in the message reporting the location of the mobile device 122. The adjustment may be (k*10) percent adjustment or another relationship.

In another embodiment, the width of the target area depends on the detected location of the mobile device 122. The center line 140 represents a center of the targeted route. Boundaries 144 define the width of the target area when the mobile device 122 is located within a first predetermined distance from the center line 140 or from one of the boundaries 144. When the mobile device 122 comes within a second predetermined distance of one of the boundaries 144, the server 125 calculates a new target width which takes into consideration the accuracy of the location determination technique.

The example target route shown in FIG. 3 provides an example where the transit path 130 has a first width at first portion 141a and a second width at second portion 141b. The difference between the inner width of the first portion 141a and the second portion 141b is illustrated as W1. At the third portion 141c, the transit path 130 returns to the first width.

Figure 4:
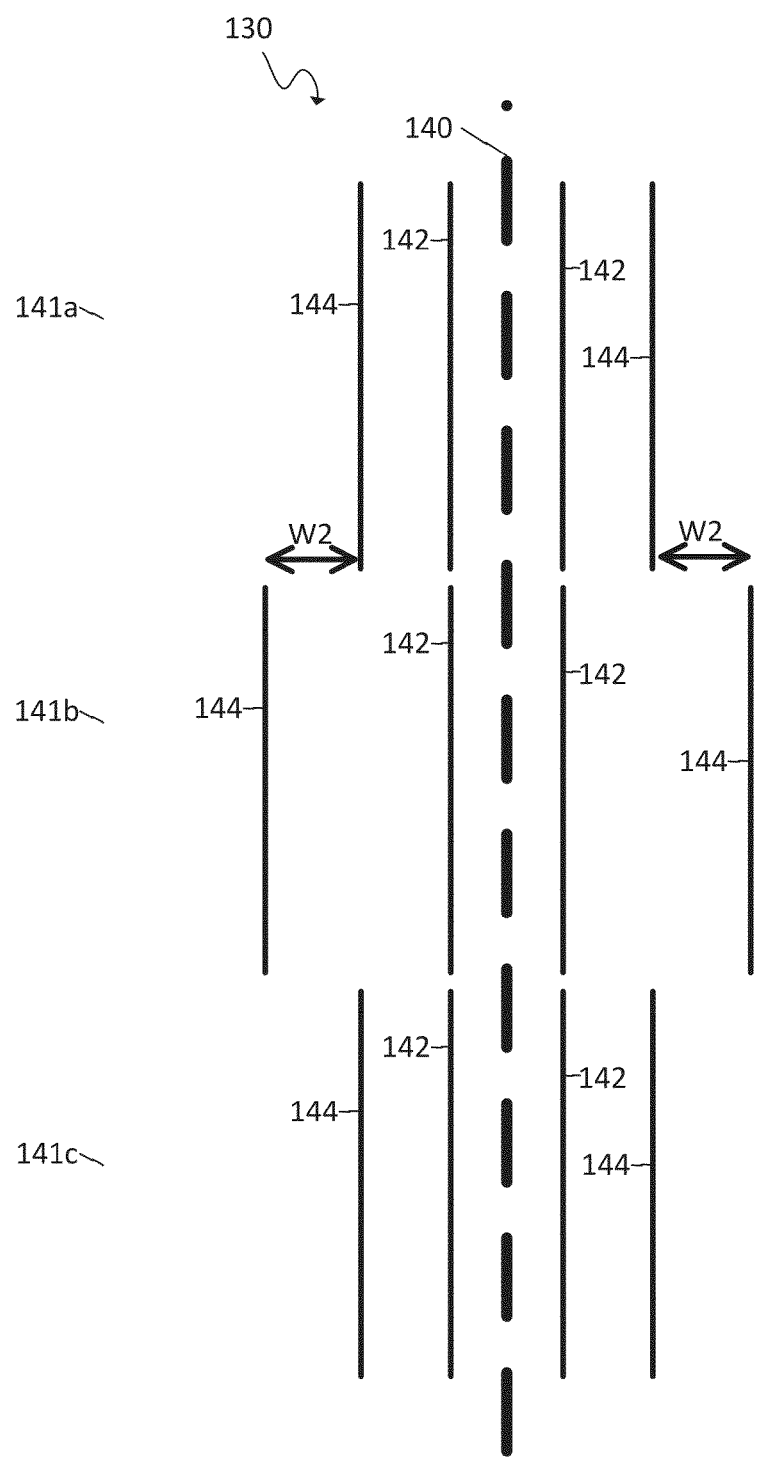
FIG. 4 illustrates another example target route for the transit path of FIG. 2.

FIG. 4 illustrates another example target route for the transit path 130 of FIG. 2. In the example shown in FIG. 4, the inner width is constant over the three portions 141a-c. However, the outer width changes according to the accuracy of the location determination system. The outer width in the second portion 141b is greater than the outer width in the first portion 141a.

The accuracy of the location determination system may be defined according to a circular error probability. The circular error probability is defined by a circle or radius of a circle of a geographic area of possible geographic locations. Each geographic location determined by the mobile device 122 could correspond to any location within the circle of error probability. The circular error probability may be statistically determined using a series of location data taken in a short time. The circular error probability may be a value stored by the mobile device 122 set at the time of manufacture.

Figure 5:
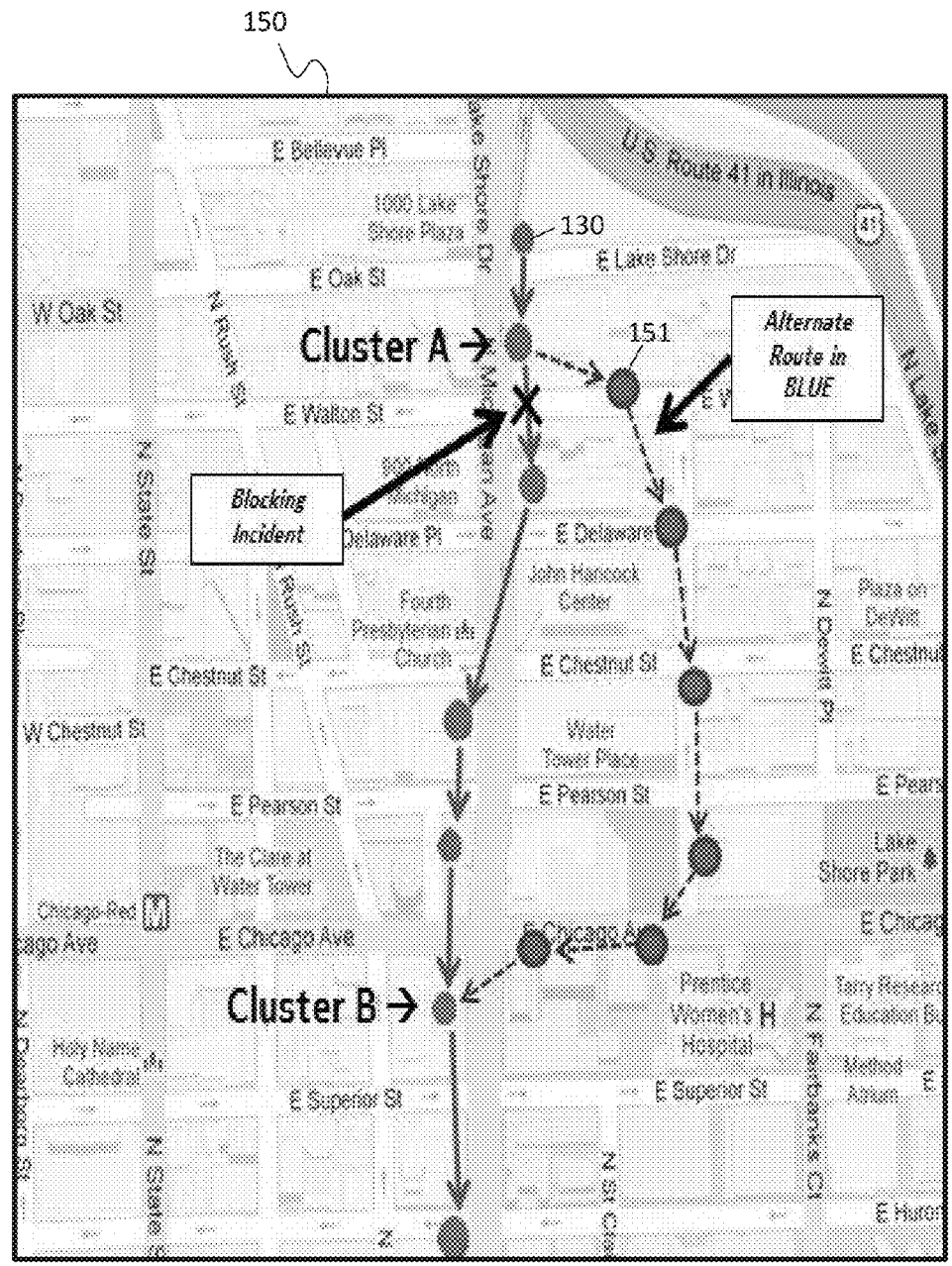
FIG. 5 illustrates an example rerouted path for the transit path of FIG. 2.

FIG. 5 illustrates an example rerouted path for the transit path of FIG. 2. A map 150 includes an expected transit path 130 and an alternate route 151 that is re-routed from the transit path 130. The server 125 or the mobile device 122 may be configured to detect when the transit vehicle has left the expected transit path 130 for the alternate route 151. Either or both of the expected transit path 130 and the alternate route 151 may be stored as clusters of collected data as shown in FIG. 5.

The map 150 may be displayed on the mobile device 122 to a user of the transit system. For example, the map 150 may be accessed using a mobile application for display transit system routes. The mobile application informs riders when a bus or other transit vehicle has deviated from the expected transit path 130. The map 150 may also illustrate a graphical indication that the expected transit path 130 is not being followed. For example, clusters or stops indicated on the expected transit path 130 may be grayed out or crossed out with an "X".

The computing resources for the detection of transit route deviation may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments").

In the server-based embodiments as discussed above, the server 125 is configured to receive location data from the mobile device 122. From the location data, the server 125 is configured to determine a target route using previously stored data regarding the classification or size of a path including or near the location data. When the mobile device 122 subsequently deviates from the path as determined from additional location data received from the mobile device 122, the server 125 is configured to identify the deviation and generate a message describing the deviation. In the endpoint-based embodiments or hybrid embodiments, one or more of these features are performed by the mobile device 122.

Figure 6:
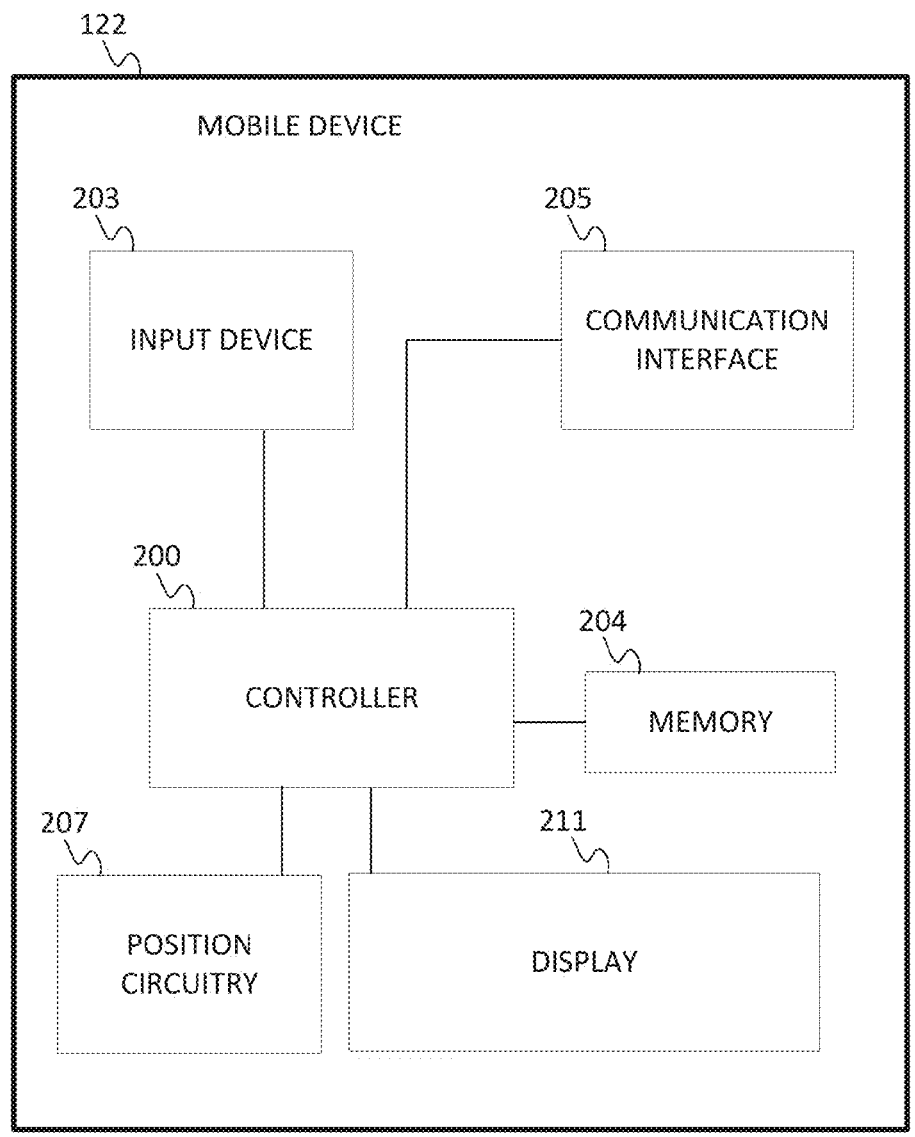
FIG. 6 illustrates an exemplary mobile device of the navigation system of FIG. 1.

FIG. 6 illustrates an exemplary mobile device 122 of the navigation system of FIG. 1. The mobile device 122 may be referred to as a navigation device. The mobile device 122 includes a controller 200, a memory 204, an input device 203, a communication interface 205, position circuitry 207, and a display 211. Additional, different, or fewer components are possible for the mobile device 122.

The memory 204 is configured to store target routes for a plurality of transit routes. The target routes may be calculated and stored in advance. The target routes may be associated with geographic locations or geographic ranges.

The controller 200 is configured to receive data indicative of the location of the mobile device 122 from the position circuitry 207. The controller 200 identifies one of the target routes based on the location of the mobile device 122. The controller 200 compares the target route to the location or a subsequent location of the mobile device 122. The comparison of the target route and the location of the mobile device 122 determines whether the location of the mobile device 122 deviates from the target route.

The positioning circuitry, which is an example of a positioning system, is configured to determine a geographic position of the mobile device 122. The positioning circuitry 207 may include sensing devices that measure the traveling distance, speed, direction, and so on, of the mobile device 122. The positioning system may also include a receiver and correlation chip to obtain a GPS signal. The positioning circuitry may include an identifier of a model of the positioning circuitry 207. The controller 200 may access the identifier and query a database or a website to retrieve the accuracy of the positioning circuitry 207 based on the identifier. The positioning circuitry 207 may include a memory or setting indicative of the accuracy of the positioning circuitry.

Alternatively or additionally, the one or more detectors or sensors in the positioning circuitry 207 may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122. The accuracy of the positioning technology affects the width of the target route.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

Figure 7:
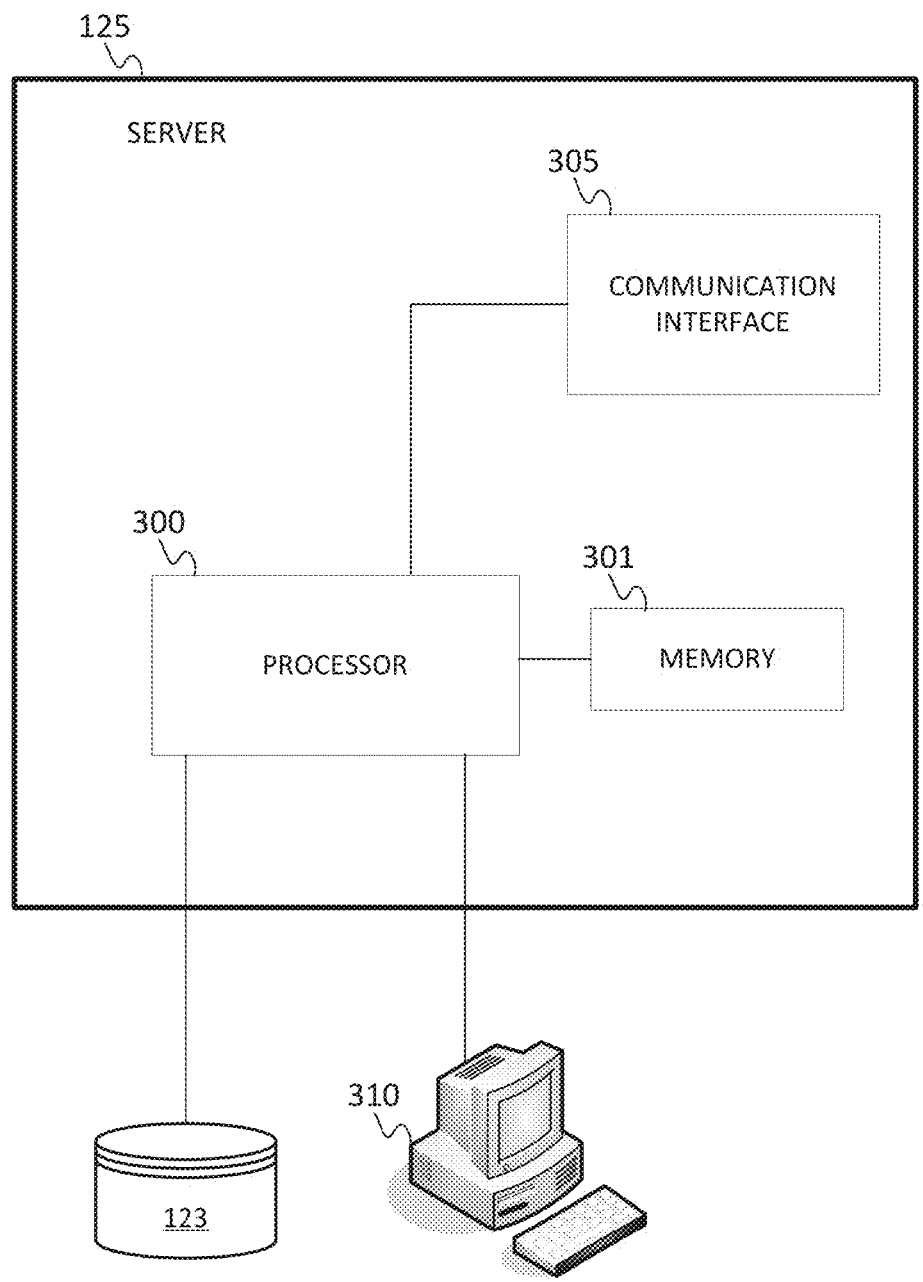
FIG. 7 illustrates an exemplary server of the navigation system of FIG. 1.

FIG. 7 illustrates an exemplary server 125 of the navigation system of FIG. 1. The server 125 includes a processor 300, a communication interface 305, and a memory 301. The server 125 may be coupled to a database 123 and a workstation 310. The database 123 may be a geographic database as discussed above. The workstation 310 may be used as an input device for the server 125. In addition, the communication interface 305 is an input device for the server 125. The communication interface 305 receives data indicative of use inputs made via the workstation 128 or the mobile device 122.

The communication interface 305 is configured to receive periodic data indicative of a location of the mobile device 122 from the mobile device 122. The processor 300 is configured to analyze the periodic data to identify a path near the mobile device 122. The processor 300 may select the path nearest to the mobile device 122 from a set of paths stored in memory 301 or database 123.

The processor 300 is also configured calculate a target route based on characteristic information for the path. The characteristic information may include the actual width of the path. The path widths may be predetermined and stored in the database 123. Alternatively, the path widths may be based on detected locations over time. The characteristic information may include a classification of the path. The database 123 may include a lookup table that correlates path classifications and path widths.

The processor 300 is configured to determine whether the mobile device 122 deviates from the path based on a comparison of the location of the mobile device 122 to the target route. The comparison may involve calculating a distance between the center of the path width and the geographic location received from the mobile device 122. The comparison may involve comparing a threshold distance to the distance from the center of the path to the geographic location received from the mobile device 122. The threshold distance may be set according to the determined path width. The threshold distance and/or path width may be further adjusted according to an accuracy level of the periodic data indicative of the location of the mobile device. The accuracy level may be tied to the mobile device 122 or the positioning technique used by the mobile device 122.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 8:
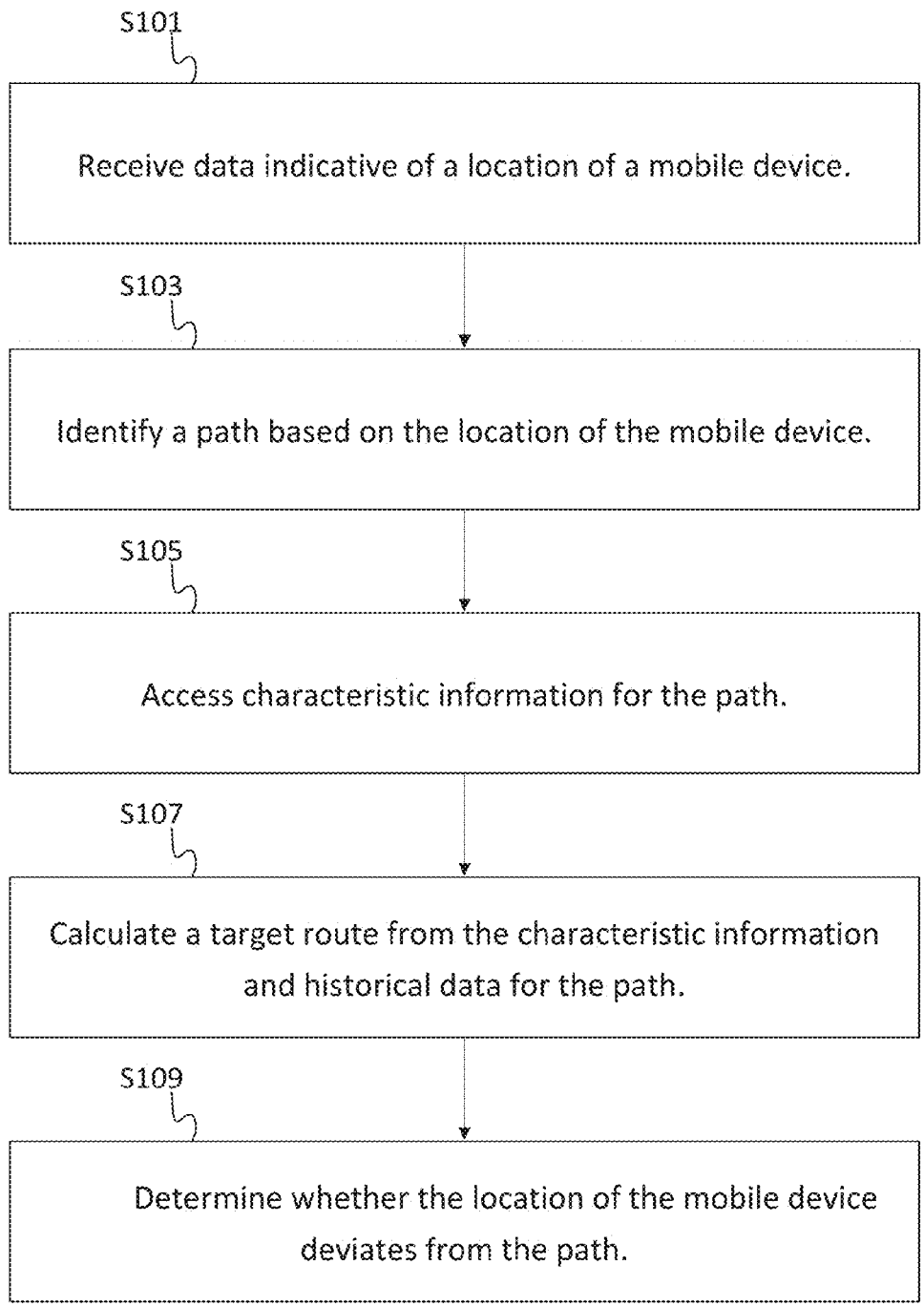
FIG. 8 illustrates an example flowchart for route deviation detection.

FIG. 8 illustrates an example flowchart for route deviation detection. The process of the flowchart may be performed by the mobile device 122 and controller 200 and/or server 125 and processor 300, which may be referred to alternatively as the controller in the following description. Alternatively, another device may be configured to perform one or more of the following acts. Additional, fewer, or different acts may be included.

At act S101, the controller receives data indicative of the location of the mobile device 122. The data may include longitude and latitude coordinates. The location data may be a running average of sensor data over a short period of time. The location data may be filtered to remove noise or outliers. The location data may be reported periodically or based on location detection command.

At act S103, the controller identifies a path based on the location of the mobile device 122. The paths may be stored according to ranges of geographic locations. The controller may select the path closest to the mobile device 122. In some scenarios, multiple routes may overlap and, the controller may be configured to select multiple paths or distinguish between routes based on multiple different locations of the mobile device 122.

At act S105, the controller accesses characteristic information for the path. The characteristic information may be any information used to describe the path and determinative of the size of the path. The characteristic information may be the explicit size of the path, or the characteristic information may include a type for the path. In one example, the type may be either a large road or a small road. In another example, the type may be the functional classification. The characteristic information or the path width may also depend on a precision factor for the positioning technique that determined the location of the mobile device 122. At act S107, the controller calculates a target route from the characteristic information and historical data for the path.

At act S109, the controller determines whether the location of the mobile device 122 deviates from the path. The controller compares periodic location data from the mobile device 122 to the target route based on the characteristic information for the path. The controller may determine whether a particular location point or a current location point in the periodic location data falls within the target route. The controller may determine how far the particular location point or the current location point is from the boundary of the target route or the center of the target route.

If the mobile device 122 leaves the target route area, a deviation is identified. The controller is configured to generate a message in response to the deviation. The message may be a message to mobile devices that indicates that transit vehicles on the path are being rerouted. The message may be a transit map used to track the location of transit vehicles. The message may include an estimated arrival time.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
receiving data indicative of a location of a mobile device;
identifying a path including a plurality of transit stops based on the location of the mobile device, wherein the plurality of transit stops are bus stops;
accessing characteristic information for the path;
calculating, by a controller, a target route from the characteristic information for the path; and
determining whether the location of the mobile device or a subsequent location of the mobile device deviates from the path based on a comparison of the location of the mobile device to the target route.

2. The method of claim 1, further comprising:
adjusting the target route according to an accuracy level of the data indicative of the location of the mobile device.

3. The method of claim 2, wherein the accuracy level is dependent on surroundings of the mobile device.

4. The method of claim 2, further comprising:
accessing a building model for an area near the mobile device; and
calculating the accuracy level based on building model.

5. The method of claim 1, wherein the characteristic information includes a functional classification of the path.

6. The method of claim 1, wherein the characteristic information includes a width of the path.

7. The method of claim 1, wherein the data is historical data; and
the historical data includes clusters of data points collected along the path and arranged based on proximity.

8. The method of claim 1, further comprising:
comparing a distance from the location of the mobile device to a border of the target route; and
extending the border of the target route by a circle of error when the distance exceeds a threshold, wherein the circle of error is based on the accuracy of position circuitry of the mobile device.

9. An apparatus comprising:
a memory configured to store target routes for a plurality of transit routes, wherein the plurality of transit routes are defined by a plurality of public transit stops, wherein the plurality of public transit stops are bus stops; and a controller configured to receive data indicative of a location of a mobile device and configured to access a target route based on the location of the mobile device, wherein a comparison of the target route and the location of the mobile device or a subsequent location of the mobile device determines whether the location of the mobile device deviates from the target route.

10. The apparatus of claim 9, wherein the target routes for the plurality of transit routes are defined by path widths.

11. The apparatus of claim 10, wherein the path widths are based on functional classifications of the transit routes.

12. The apparatus of claim 10, wherein the path widths are based on accuracy of a positioning system of the mobile device.

13. The apparatus of claim 10, wherein the path widths are based on a building model associated with the location of the mobile device.

14. The apparatus of claim 10, further comprising:
positioning circuitry configured to generate the data indicative of the location of the mobile device.

15. A non-transitory computer readable medium including instructions that when executed are operable to:
receive data indicative of a location of the mobile device at different times;
identify a path including a plurality of transit stops based on the data indicative of the location of the mobile device, wherein the plurality of transit stops are bus stops;
identify a target route based on characteristic information for the path; and
determining whether the mobile device deviates from the path based on a comparison of the location of the mobile device to the target route.

16. The non-transitory computer readable medium of claim 15, wherein the characteristic information for the path includes a functional classification of the path.

17. The non-transitory computer readable medium of claim 15, wherein the characteristic information for the path includes a width of the path.

18. The non-transitory computer readable medium of claim 15, wherein the characteristic information for the path includes an accuracy level of the data indicative of the location of the mobile device.

* * * * *